G. FRANCHINI.
WARNING SIGNAL.
APPLICATION FILED JUNE 8, 1921.
1,414,078.
Patented Apr. 25, 1922.
2 SHEETS—SHEET 1.
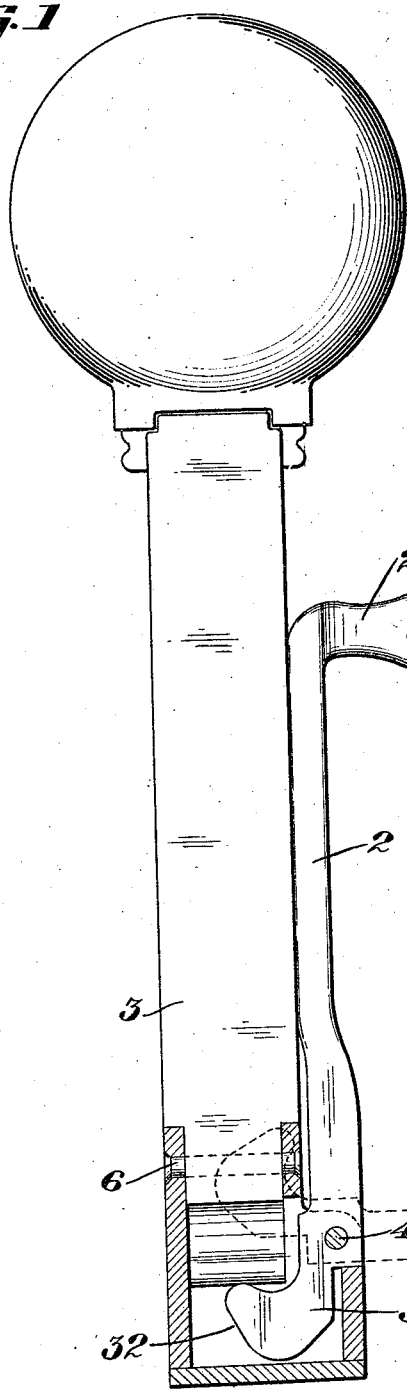
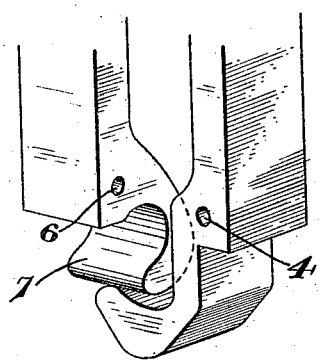
INVENTOR.
GIOVANNI FRANCHINI.
BY Chas. E. Townsend
ATTORNEY.

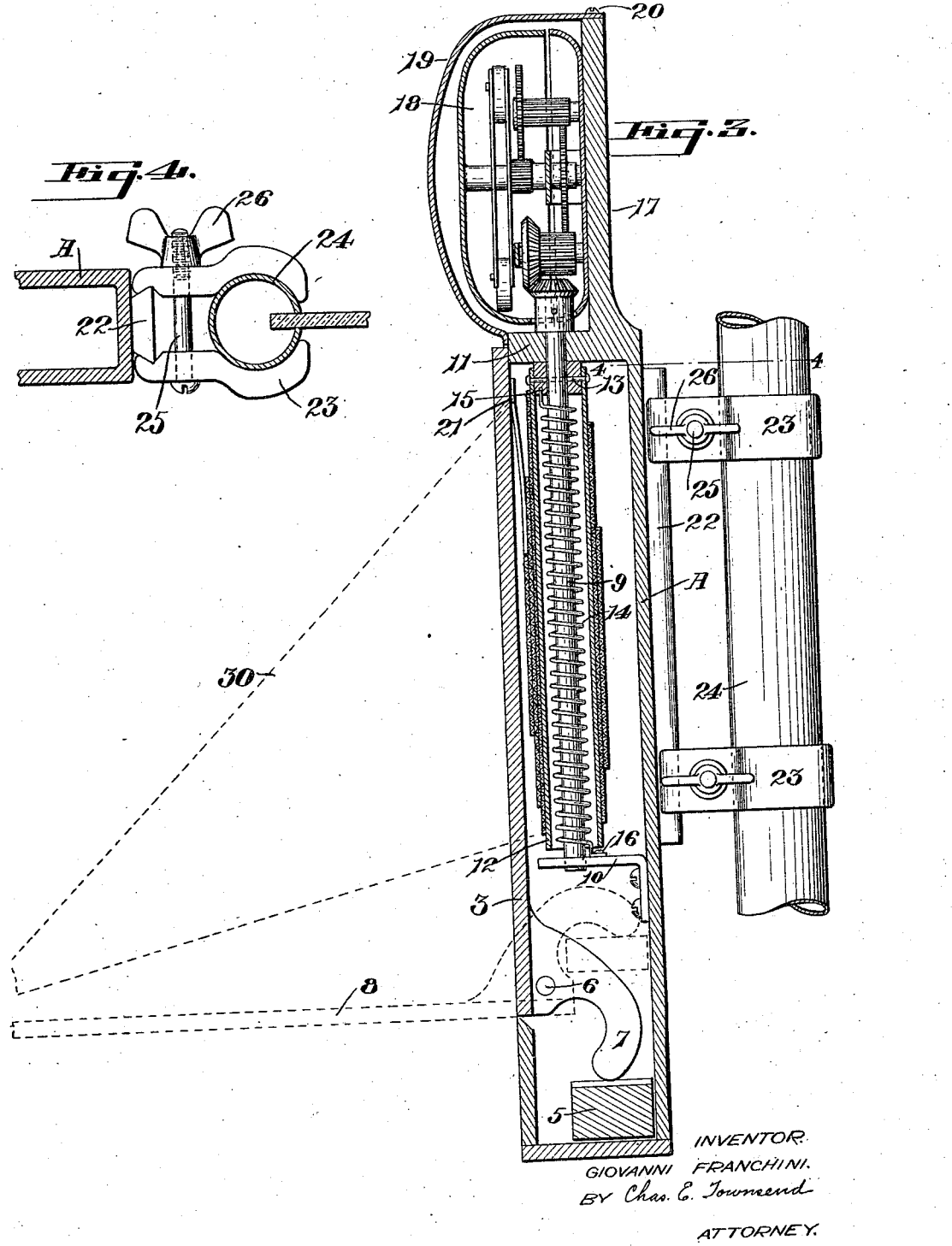

UNITED STATES PATENT OFFICE.

GIOVANNI FRANCHINI, OF SAN FRANCISCO, CALIFORNIA.

WARNING SIGNAL.

1,414,078.　　　Specification of Letters Patent.　　Patented Apr. 25, 1922.

Application filed June 8, 1921. Serial No. 475,985.

*To all whom it may concern:*

Be it known that I, GIOVANNI FRANCHINI, a subject of the King of Italy, residing at the city and county of San Francisco and State of California, have invented new and useful Improvements in Warning Signals, of which the following is a specification.

This invention relates to a signalling mechanism, and especially to a warning signal to be employed on automobiles and like vehicles.

One of the objects of the present invention is to generally improve and simplify devices of the character described, and especially to provide a compact easily operated signalling mechanism which may be readily attached to one side of the windshield of an automobile within convenient reach of the driver, or at any other desired place within reach.

Another object of the invention is to provide a signalling mechanism which, when operated, will display a visible warning signal, and simultaneously sound an audible alarm, thus warning other vehicles or pedestrians, whether in front of the automobile, or following the same, that the driver intends to stop, turn or otherwise manœuvre.

Further objects will hereinafter appear.

The invention consists of the parts and the construction, combination and arrangement of parts as hereinafter more fully described and claimed, having reference to the accompanying drawings, in which—

Fig. 1 is a side elevation of the signalling mechanism partly broken away.

Fig. 2 is a perspective view of the lever cams showing the position of one with relation to the other.

Fig. 3 is a central vertical longitudinal section taken at right angles to Fig. 1.

Fig. 4 is a detail cross section taken on line 4—4, Fig. 3.

Referring to the drawings in detail, A indicates in general a casing which is substantially square in cross section. The casing is considerably long as shown in Figs. 1 and 3, and the lower end thereof supports an operating lever 2 and an arm 3. The lever 2 is pivotally mounted in the casing as at 4 and it terminates in a cam shaped member 5. The arm 3 is also pivotally mounted in the lower end of the casing as at 6; the pivotal connection being disposed at right angles to the pivotal mounting 4 of the operating lever. (See particularly Fig. 2.) The arm 3 also terminates in a cam indicated at 7, which is disposed directly above the lower end of the cam 5. The arm serves two functions, first that of a cover or closure for an opening formed in one side of the casing, and secondly that of a display arm, that is arm 3 when swung outwardly to display a signal assumes the dotted line position indicated at 8.

Mounted within the casing is a shaft 9. This shaft is journalled at its lower end in a bearing bracket 10, and its upper end extends through a shelf 11 in which it is journalled. Surrounding the shaft is a tube 12, the upper end of which is secured to the shaft to rotate in unison therewith as at 13. Mounted within the shaft is a helical spring 14. One end of the spring is secured to the tube as at 15, while the opposite end is secured to the bearing bracket 10 as shown at 16. Disposed on the shelf or secured to a vertical extension formed thereon and indicated at 17 is a bell 18. The shaft 9 extends upwardly into the bell and when rotated operates the mechanism contained therein, thus sounding an audible alarm. The bell proper is protected by an enclosing casing 19, which is secured to the shelf 11 and the extension 17 by means of screws 20. The spring 14 acts in a manner similar to a spring in a window shade roller, that is rotation of the shaft 9 and the tube 12, which turns in unison therewith, places the spring under a tension; said tension being sufficient to reverse the direction of rotation when the shaft is released. Wound about the tube 14 is a piece of fabric. One end of the fabric is secured to the tube, while the other end of the fabric is attached to the upper end of the arm 3 as at 21. The fabric is in reality nothing more or less than a signal flag and is preferably triangular in shape as indicated by dotted lines in Fig. 3.

For the purpose of rendering the mechanism as a whole easily attachable to any suitable support on a vehicle, I have formed a dovetailed rib 22 on one side of the casing. This rib is adapted to be engaged by a double acting clamp such as shown at 23; the opposite end of the clamp being engageable with the windshield frame as shown at 24, or with any other suitable support desired. There may be two or more clamps employed as shown in Fig. 3, which are secured by screws 25 and thumb nuts 26. With the signalling mechanism as a whole attached to one side of the windshield, within convenient reach of the driver, and if it is desired to attract the attention of other vehicles, for instance when desiring to stop, turn or otherwise manœuvre, it is only necessary for the operator to grasp a handle extension 28 formed on the upper end of the lever 2, and to pull the lever downwardly to assume the dotted line position shown at 29. (See Fig. 1.) Such operation will cause the cam 5 to engage the lower end of the cam 7 and as this cam is disposed on one side of the pivotal support 6, it is obvious that arm 3 will be swung about the pivot to assume the dotted line position shown at 8. A pull will in this manner be exerted on the signal flag which will be unwound with relation to the tube 12; the flag when displayed assuming the position indicated by dotted lines at 30. The unwinding of the flag imparts a rotary movement to the tube and the shaft 9 and thereby places the spring 14 under such tension that when the lever 2 is released or returned to its normal position shown in Fig. 1, the flag will be unwound and the arm 3 will be pulled back to normal vertical position. The flag re-rolled is housed or enclosed by the casing A and is thus protected against the elements or injury. A rotary movement is transmitted to the shaft both during the unwinding of the flag and during the re-winding of the same. This rotary movement, as previously stated, actuates the bell mechanism and thereby sounds an audible alarm both when extending the flag and when retracting the same. An audible and a visible warning signal is thus given to other vehicles or pedestrians, whether in front of the driver or whether following him, and the driver is therefore free to turn, stop or otherwise manœuvre.

By referring to Figs. 1 and 2, it will be seen that one side of the cam presents a flat surface as indicated at 32. This is of considerable importance as the flat surface engages the lower end of the cam 7 when the lever 2 and the arm 3 reach a horizontal position. They are thereby locked and assume this position until the lever 2 is again swung in an upward direction. In fact the operator merely needs to slightly lift the lever 2 as the remainder of the movement of both the lever and the arm 3 is taken care of by the tension of the spring 14, that is cam 5 lifts the cam 7 in an upward direction, while the cam 7 engages the cam 5 and forces this in a downward direction during return or rewinding movement. The depression of the lever 2 is always manual, but it is returned automatically once it has been started.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. A device of the character described comprising an elongated vertically disposed casing, an arm forming a closure for one side thereof, said arm being pivotally attached at its lower end to the casing, a cam formed on the lower end of the arm, an operating lever pivotally mounted at its lower end in the casing and said pivot being disposed at right angles to the pivot supporting the arm, a cam on the lower end of the operating lever disposed below the cam on the arm, said lever adapted to be manually disposed to swing the arm from vertical to horizontal position, a reel within the casing, a flag secured thereto and normally wound about the reel, one end of the flag being secured to the arm, and an audible alarm mechanism actuated by turning movement of the reel.

2. A device of the character described comprising an elongated vertically disposed casing, an arm forming a closure for one side thereof, said arm being pivotally attached at its lower end to the casing, a cam formed on the lower end of the arm, an operating lever pivotally mounted at its lower end in the casing and said pivot being disposed at right angles to the pivot supporting the arm, a cam on the lower end of the operating lever disposed below the cam on the arm, said lever adapted to be manually disposed to swing the arm from vertical to horizontal position, a reel within the casing, a flag secured thereto and normally wound about the reel, one end of the flag being secured to the arm, a spring within the reel secured at one end to the reel and at the opposite end to a stationary support, said spring adapted to be placed under tension when the flag is unwound and adapted to automatically rewind the flag and raise the arm to vertical position, a bell supported by the casing, and means actuated by turning movement of the reel for sounding the bell.

3. In a device of the character described the combination with the display arm and the manually actuated operating lever, of a cam formed in the lower end of the display arm, a cam formed on the lower end of the operating lever and disposed below the first named cam, said cams disposed at right angles to each other, a flattened surface formed on the last named cam adapted to engage the first named cam when the display arm and the operating lever assume horizontal position, said flattened surface locking the arm and lever against movement.

4. An automobile signaling device comprising a vertically disposed stationary casing having one side hinged near the bottom, a cam at its lower end, an operating lever fulcrumed at right angles to the hinge and having a cam end to engage the first-named cam and turn the movable side outwardly, a shaft turnable within the casing, a surrounding spring and an enclosing tube fixed to and turnable with the shaft, a fabric flag coiled about the tube, said flag being uncoiled and projected through the opened side of the casing, a gong fixed above the casing, and mechanism actuated by the turning of the shaft to sound the gong in unison with the display or return of the flag.

5. An automobile signaling device including a fixed casing with an outwardly opening hinged side, a vertically journaled shaft and enclosing tube within the casing, a gong fixed above the casing and actuating mechanism driven by the shaft, a fabric flag coiled upon the tube and adapted to be displayed through the casing side when opened, a spiral spring within the tube and fixed to the shaft to actuate the audible signal and return the flag, and a lever hinged at the bottom and having a cam engageable with a cam by which the casing side is opened, said first cam having a flattened side to engage the second cam and retain the parts in position until the lever is returned to its normal position.

GIOVANNI FRANCHINI.